US010183712B2

(12) United States Patent
Yamaguchi

(10) Patent No.: US 10,183,712 B2
(45) Date of Patent: Jan. 22, 2019

(54) WALKING CONTROL METHOD, WALKING CONTROL PROGRAM AND BIPED WALKING ROBOT

(71) Applicants: PANASONIC CORPORATION, Osaka (JP); Masahiko Yamaguchi, Shizouka (JP)

(72) Inventor: Masahiko Yamaguchi, Shizouka (JP)

(73) Assignees: PANASONIC CORPORATION, Osaka (JP); Masahiko Yamaguchi, Shizuoka (JP)

( * ) Notice: Subject to any disclaimer, the term of this patent is extended or adjusted under 35 U.S.C. 154(b) by 139 days.

(21) Appl. No.: 15/585,604

(22) Filed: May 3, 2017

(65) Prior Publication Data
US 2017/0327165 A1    Nov. 16, 2017

(30) Foreign Application Priority Data

May 10, 2016  (JP) .................................. 2016-094364

(51) Int. Cl.
*B62D 57/032* (2006.01)
(52) U.S. Cl.
CPC ........... *B62D 57/032* (2013.01); *Y10S 901/01* (2013.01)
(58) Field of Classification Search
CPC ...... B62D 57/02; B62D 57/032; B25J 13/085; B25J 13/088; B25J 9/1694; Y10S 901/01
USPC ......................................................... 700/245
See application file for complete search history.

(56) References Cited

U.S. PATENT DOCUMENTS

| | | | | | |
|---|---|---|---|---|---|
| 4,834,200 | A | * | 5/1989 | Kajita | B62D 57/02 180/8.1 |
| 5,432,417 | A | * | 7/1995 | Takenaka | B62D 57/032 180/8.6 |
| 5,459,659 | A | * | 10/1995 | Takenaka | B62D 57/032 180/8.1 |
| 6,915,230 | B2 | * | 7/2005 | Kawai | A61B 5/1038 702/127 |
| 6,992,456 | B2 | * | 1/2006 | Furuta | B62D 57/032 318/568.11 |
| 7,881,824 | B2 | * | 2/2011 | Nagasaka | B25J 13/085 700/245 |
| 7,957,835 | B2 | * | 6/2011 | Suga | B62D 57/032 318/568.12 |
| 8,554,366 | B2 | * | 10/2013 | Kajima | B62D 57/032 318/568.12 |

(Continued)

FOREIGN PATENT DOCUMENTS

JP          3167406          3/2001

*Primary Examiner* — Jaime Figueroa
(74) *Attorney, Agent, or Firm* — Wenderoth, Lind & Ponack, L.L.P.

(57) ABSTRACT

Provided is a walking control method enabling stable walking operation to be realized, a walking control program and a biped walking robot. A walking control method includes, during walking operation of a biped walking robot having a position of center of gravity being adjusted at a predetermined reference angle that enables the robot to be upright, a step of acquiring information indicative of an inclination angle of an upper body relative to the reference angle, and a step of operating, with one of a first leg and a second leg not being grounded due to the walking operation, the first leg and the second leg such that the upper body is maintained within a predetermined angle range relative to the reference angle according to the inclination angle.

16 Claims, 11 Drawing Sheets

(56) References Cited

U.S. PATENT DOCUMENTS

| | | | |
|---|---|---|---|
| 8,565,921 B2* | 10/2013 | Doi | B62D 57/032 |
| | | | 318/568.1 |
| 9,073,209 B2* | 7/2015 | Lee | B25J 9/162 |
| 10,099,378 B2* | 10/2018 | Kaneko | B25J 9/1694 |
| 2004/0167641 A1* | 8/2004 | Kawai | A61B 5/1038 |
| | | | 700/63 |
| 2009/0271037 A1* | 10/2009 | Hong | B62D 57/032 |
| | | | 700/253 |
| 2013/0144439 A1* | 6/2013 | Lee | B25J 9/1633 |
| | | | 700/261 |
| 2013/0178983 A1* | 7/2013 | Watabe | G05D 3/12 |
| | | | 700/258 |
| 2015/0202768 A1* | 7/2015 | Moridaira | B62D 57/032 |
| | | | 700/258 |
| 2015/0231786 A1* | 8/2015 | Doi | B25J 9/1605 |
| | | | 700/245 |

* cited by examiner

STATE WHERE
UPPER BODY
INCLINES BY $\delta\theta x$

STATE WHERE
INCLINATION
OF UPPER BODY
IS CORRECTED

WALKING CONTROL METHOD, WALKING CONTROL PROGRAM AND BIPED WALKING ROBOT

TECHNICAL FIELD

The present disclosure relates to a walking control method for controlling walking operation of a biped walking robot, a walking control program and a biped walking robot.

BACKGROUND ART

Conventionally, biped walking robots have been developed that imitate physical mechanism and movement of a biped walking animal such as a human being.

For example, Patent Literature 1 discloses a walking control device of a legged mobile robot configured to have a body and a plurality of leg links each connected to the body through a first joint and each having at least a second joint so as to walk while supporting a self-weight alternately by the plurality of leg links.

The conventional walking control device, including servo motors provided at the individual joints of the robot for controlling an angle of each joint to follow a target value, detects an inclination angle and/or an inclination angular velocity of the body in terms of an absolute angle (angle with respect to a direction of gravity) and adds a correction amount obtained by multiplying a detected value by a predetermined gain to a control value of the first joint and/or the second joint of the leg links on a free leg side.

CITATION LIST

[Patent Literature 1] Japanese Patent No. 3,167,406

SUMMARY OF INVENTION

The walking control device recited in Patent Literature 1 conducts control such that a free leg steps forward toward an inclination direction in a stride proportional to an amount of inclination. Specifically, the walking control device recited in Patent Literature 1 is configured to ensure stability after a free leg lands not by constantly maintaining a trunk portion vertically but by making a stride correspond to an inclination angle remaining immediately before landing of the free leg.

In a conventional walking control device, for example, when a biped walking robot receives an external force, with one leg thereof grounded and is restored to an upright state while being inclined, an inclination might not be restored to thus remain or the inclination might be increased.

The present disclosure, which is directed at solving the above problem, aims at providing a walking control method enabling stable walking operation to be realized, a walking control program and a biped walking robot.

A walking control method according to one aspect of the present disclosure is a walking control method in a walking control device which controls walking operation of a biped walking robot including an upper body, a first leg connected to the upper body, a second leg connected to the upper body, a first driving unit which drives the first leg, and a second driving unit which drives the second leg, the method including acquiring, during the walking operation of the biped walking robot, information indicative of an inclination angle of the upper body relative to the reference angle, the biped walking robot having a position of center of gravity adjusted at a predetermined reference angle that enables the robot to be upright, and operating, with one of the first leg and the second leg not being grounded due to the walking operation, the first leg and the second leg such that the upper body is maintained within a predetermined angle range relative to the reference angle according to the inclination angle.

According to the present disclosure, since the upper body is maintained within a predetermined angle range relative to a predetermined reference angle, with one of the first leg and the second leg not being grounded due to walking operation, stable walking operation can be realized.

Figure 1:
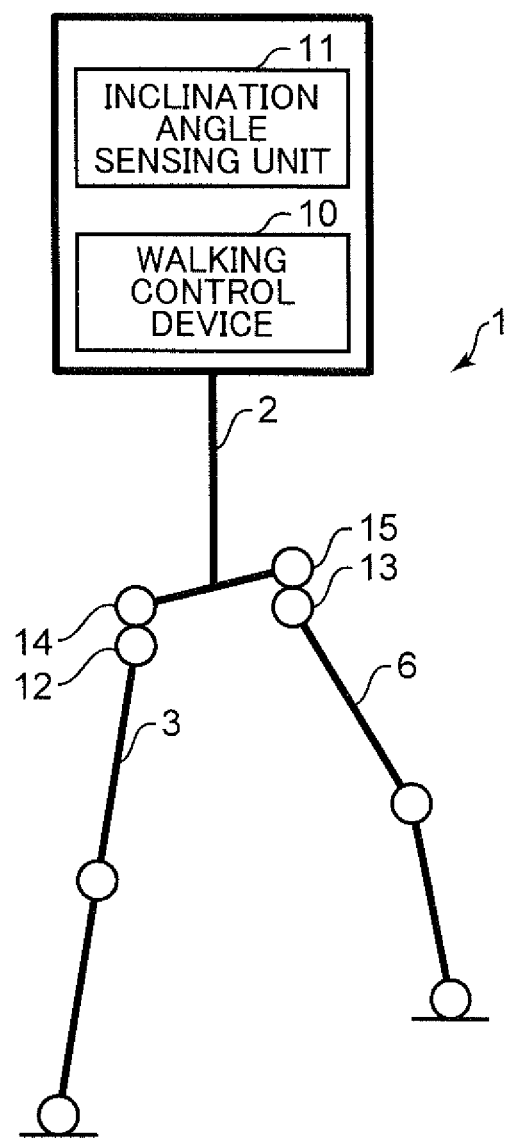
FIG. 1 is a diagram showing a configuration of a biped walking robot in a present embodiment.

DESCRIPTION OF EMBODIMENT (Knowledge Forming Basis of the Present Disclosure)

As a biped walking robot balance control method, a balance control method based, as a norm, on a dynamic idea called zero moment point (hereinafter, abbreviated as ZMP) is generally known.

When a biped walking robot walks, gravity exerted by the earth and inertial force generated by walking act on the biped walking robot. At an intersection point between the ground and an axis of a resultant force obtained from gravity and inertial force, a moment of the resultant force attains 0, and therefore the point is referred to as a ZMP. Additionally, to a landed foot of the biped walking robot, a floor reaction force acts as a reaction from the ground. A point on which the floor reaction force acts is called a floor reaction force working point (a center of pressure). When a biped walking robot walks while maintaining ideal balance, a target ZMP and a floor reaction force working point are coincident with each other. In other words, making a target ZMP and a floor reaction force working point be coincident with each other enables a biped walking robot to stably walk without losing balance.

However, in a walking control method using a ZMP, since a robot keeps balance by detecting a floor reaction force working point by a sensor provided on a foot sole thereof, the robot tends to be unstable on an irregular ground, on foreign substances on a floor surface or on undulations. Additionally, although it is necessary to generate a gait while being always conscious of a target ZMP, a track coincident with the target ZMP cannot be uniquely calculated for generating a gait, so that an amount of calculation is ordinarily increased, such as approximation by convergence calculation. Further, it is hard to follow quick movement because a floor reaction force working point is a crucial element and calculation of a gait is difficult. Further, it is also difficult to cope with a change in a position of center of gravity caused by arbitrary movement of an upper body, thereby making a robot easily lose balance against quick movement as well.

Additionally, as described above, the walking control device recited in Patent Literature 1 conducts control such that a free leg steps forward toward an inclination direction in a stride proportional to an amount of inclination. Specifically, the walking control device recited in Patent Literature 1 is configured to ensure stability after a free leg lands not by constantly maintaining a trunk portion vertically but by making a stride correspond to an inclination angle remaining immediately before landing of the free leg.

In a conventional walking control device, for example, when a biped walking robot receives an external force, with one leg thereof grounded and is restored to an upright state while being inclined, an inclination might not be restored to thus remain or the inclination might be increased.

In order to solve such a problem, a walking control method according to one aspect of the present disclosure is a walking control method in a walking control device which controls walking operation of a biped walking robot including an upper body, a first leg connected to the upper body, a second leg connected to the upper body, a first driving unit which drives the first leg, and a second driving unit which drives the second leg, the method including acquiring, during the walking operation of the biped walking robot, information indicative of an inclination angle of the upper body relative to the reference angle, the biped walking robot having a position of center of gravity adjusted at a predetermined reference angle that enables the robot to be upright, and operating, with one of the first leg and the second leg not being grounded due to the walking operation, the first leg and the second leg such that the upper body is maintained within a predetermined angle range relative to the reference angle according to the inclination angle.

According to this configuration, the biped walking robot has a position of center of gravity adjusted at a predetermined reference angle that enables the robot to be upright. During walking operation of the biped walking robot, information indicative of an inclination angle of the upper body relative to the reference angle is acquired. With one of the first leg and the second leg not being grounded due to the walking operation, the first leg and the second leg are operated such that the upper body is maintained within a predetermined angle range relative to the reference angle according to the inclination angle.

Accordingly, since the upper body is maintained within a predetermined angle range relative to a predetermined reference angle that enables the robot to be upright, with one of the first leg and the second leg not being grounded due to walking operation, stable walking operation can be realized.

Additionally, in the above walking control method, when the first leg and the second leg are operated such that the upper body is maintained within the predetermined angle range relative to the reference angle, a first correction signal may be generated for correcting operation of each of the first leg and the second leg in order to maintain the upper body within the predetermined angle range relative to the reference angle based on the inclination angle, and a control signal may be corrected based on the first correction signal, the control signal for causing the first leg and the second leg to conduct walking operation, and the corrected control signal may be output to each of the first driving unit and the second driving unit.

According to this configuration, when the first leg and the second leg are operated such that the upper body is maintained within the predetermined angle range relative to the reference angle, the first correction signal is generated for correcting operation of each of the first leg and the second leg in order to maintain the upper body within the predetermined angle range relative to the reference angle based on the inclination angle. The control signal is corrected based on the first correction signal, the control signal for causing the first leg and the second leg to conduct walking operation. The corrected control signal is output to each of the first driving unit and the second driving unit.

Accordingly, the upper body can be maintained within the predetermined angle range relative to the reference angle by correcting the control signal based on the first correction signal, the control signal for causing the first leg and the second leg to conduct walking operation.

Additionally, in the above walking control method, the first correction signal may be generated by adding a first correction amount to an integrated correction amount, the first correction amount being calculated in order to maintain the upper body within the predetermined angle range relative to the reference angle based on the inclination angle, and the integrated correction amount having been integrated before the first correction amount is calculated.

According to this configuration, the first correction signal is generated by integrating the first correction amount to the integrated correction amount, the first correction amount being calculated in order to maintain the upper body within the predetermined angle range relative to the reference angle based on the inclination angle, and the integrated correction amount having been integrated before the first correction amount is calculated.

Accordingly, since the first correction signal is generated by adding the first correction amount according to the inclination angle of the upper body to the integrated correction amount, a stable point of a biped walking robot can be held to realize stable balance control.

Additionally, in the above walking control method, the first correction amount may be calculated using a first function with the inclination angle at a predetermined time point as a variable.

According to this configuration, use of the first function enables the first correction amount according to an inclination angle of an upper body to be easily calculated.

Additionally, the above walking control method may include generating a first control signal for causing a support leg, either the first leg or the second leg, to conduct walking operation, generating a second control signal for causing a free leg, either the first leg or the second leg, to conduct walking operation, generating a third control signal as a synthesis of the first control signal and the first correction signal, outputting the third control signal to one of the first leg and the second leg, which serves as a support leg, generating a fourth control signal as a synthesis of the second control signal and the first correction signal, and outputting the fourth control signal to the other of the first leg and the second leg, which serves as a free leg.

According to this configuration, the first control signal is generated for causing a support leg, either the first leg or the second leg, to conduct walking operation. The second control signal is generated for causing a free leg, either the first leg or the second leg, to conduct walking operation. The third control signal is generated by synthesizing the first control signal and the first correction signal, and the third control signal is output to one of the first leg and the second leg, which serves as a support leg. The fourth control signal is generated by synthesizing the second control signal and the first correction signal, and the fourth control signal is output to the other of the first leg and the second leg, which serves as a free leg.

Accordingly, one of the first leg and the second leg, which serves as a support leg, and the other of the first leg and the second leg, which serves as a free leg, can be operated such that the upper body is maintained within the predetermined angle range relative to a reference angle.

Additionally, in the above walking control method, the first correction amount and the integrated correction amount may be calculated based on an inclination angle of the biped walking robot in a front-rear direction, the first control signal may include a first front-rear direction control signal for causing a support leg, either the first leg or the second leg, to be rotatably driven in the front-rear direction in walking operation of the biped walking robot, and the second control signal may include a second front-rear direction control signal for causing a free leg, either the first leg or the second leg, to be rotatably driven in the front-rear direction in the walking operation of the biped walking robot, the third control signal may be generated by adding the first correction signal to the first front-rear direction control signal, and the fourth control signal may be generated by subtracting the first correction signal from the second front-rear direction control signal.

According to this configuration, the first correction amount and the integrated correction amount are calculated based on an inclination angle of the biped walking robot in the front-rear direction. The first control signal includes the first front-rear direction control signal for causing a support leg, either the first leg or the second leg, to be rotatably driven in the front-rear direction in the walking operation of the biped walking robot. The second control signal includes the second front-rear direction control signal for causing a free leg, either the first leg or the second leg, to be rotatably driven in the front-rear direction in the walking operation of the biped walking robot. The third control signal is generated by adding the first correction signal to the first front-rear direction control signal. Additionally, the fourth control signal is generated by subtracting the first correction signal from the second front-rear direction control signal.

Accordingly, since the first correction amount and the integrated correction amount are calculated based on an inclination angle of the biped walking robot in the front-rear direction, the first leg and the second leg can be driven in the front-rear direction to maintain the upper body within the predetermined angle range relative to a reference angle.

Additionally, the above walking control method may include determining whether or not a first driving amount of the first leg or the second leg based on the third control signal exceeds a first threshold value, and determining whether or not a second driving amount of the first leg or the second leg based on the fourth control signal exceeds the first threshold value, when determining that the first driving amount exceeds the first threshold value, changing the first driving amount to the first threshold value and when determining that the second driving amount exceeds the first threshold value, changing the second driving amount to the first threshold value.

According to this configuration, determination is made as to whether or not the first driving amount of the first leg or the second leg based on the third control signal exceeds the first threshold value. Determination is made as to whether or not the second driving amount of the first leg or the second leg based on the fourth control signal exceeds the first threshold value. When determining that the first driving amount exceeds the first threshold value, the first driving amount is changed to the first threshold value. Additionally, when determining that the second driving amount exceeds the first threshold value, the second driving amount is changed to the first threshold value.

Accordingly, the first driving amount for a support leg and the second driving amount for a free leg can be both controlled so as not to exceed the first threshold value that allows driving.

Additionally, in the above walking control method, when the biped walking robot is supported by both the first leg and the second leg, calculation of the first correction amount is not required.

According to this configuration, since the first correction amount is not calculated when the biped walking robot is supported by both the first leg and the second leg, a change of a stride due to addition of the first correction amount to the integrated correction amount can be prevented.

Additionally, in the above walking control method, the first correction amount and the integrated correction amount may be calculated based on an inclination angle of the biped walking robot in a right-left direction, the first control signal may include a first right-left direction control signal for causing a support leg, either the first leg or the second leg, to be rotatably driven in the right-left direction in walking operation of the biped walking robot, and the second control signal may include a second right-left direction control signal for causing a free leg, either the first leg or the second leg, to be rotatably driven in the right-left direction in the walking operation of the biped walking robot, the third control signal may be generated by adding the first correction signal to the first right-left direction control signal, and the fourth control signal may be generated by adding a second correction signal to the second right-left direction control signal, the second correction signal obtained by multiplying the first correction signal by a predetermined coefficient.

According to this configuration, the first correction amount and the integrated correction amount are calculated based on an inclination angle of the biped walking robot in a right-left direction. The first control signal includes the first right-left direction control signal for causing a support leg, either the first leg or the second leg, to be rotatably driven in the right-left direction in the walking operation of the biped walking robot. The second control signal includes the second right-left direction control signal for causing a free leg, either the first leg or the second leg, to be rotatably driven in the right-left direction in the walking operation of the biped walking robot. The third control signal is generated by adding the first correction signal to the first right-left direction control signal. The fourth control signal is generated by adding the second correction signal to the second right-left direction control signal, the second correction signal obtained by multiplying the first correction signal by a predetermined coefficient.

Accordingly, since the first correction amount and the integrated correction amount are calculated based on an inclination angle in the right-left direction of the biped walking robot, the first leg and the second leg can be driven in the right-left direction, and the upper body can be maintained within the predetermined angle range relative to a reference angle.

Additionally, the above walking control method may include determining whether or not a first driving amount of the first leg or the second leg based on the third control signal exceeds a second threshold value that the first leg and the second leg interfere, determining whether or not a second driving amount of the first leg or the second leg based on the fourth control signal exceeds the second threshold value, when determining that the first driving amount exceeds the second threshold value, changing the first driving amount to a predetermined value smaller than the second threshold value, and when determining that the second driving amount exceeds the second threshold value, changing the second driving amount to a predetermined value smaller than the second threshold value.

According to this configuration, determination is made as to whether or not the first driving amount of the first leg or the second leg based on the third control signal exceeds the second threshold value that the first leg and the second leg interfere. Determination is made as to whether or not the second driving amount of the first leg or the second leg based on the fourth control signal exceeds the second threshold value. When determining that the first driving amount exceeds the second threshold value, the first driving amount is changed to a predetermined value smaller than the second threshold value. Additionally, when determining that the second driving amount exceeds the second threshold value, the second driving amount is changed to a predetermined value smaller than the second threshold value.

Accordingly, the first driving amount for a support leg and the second driving amount for a free leg can be both controlled so as not to exceed the second threshold value that allows driving.

Additionally, in the above walking control method, when a value indicating irregularities of a surface on which the biped walking robot walks is not more than a predetermined value, the predetermined coefficient may be set to be a positive value.

According to this configuration, setting a predetermined coefficient, which is to be multiplied with the first correction signal, to be a positive value enables a biped walking robot to stably walk on a walking surface with fewer irregularities.

Additionally, in the above walking control method, when a value indicating irregularities of the surface on which the biped walking robot walks is more than the predetermined value, the predetermined coefficient may be set to be a negative value.

According to this configuration, setting a predetermined coefficient, which is to be multiplied with the first correction signal, to be a negative value enables a biped walking robot to stably walk on a walking surface with irregularities.

Additionally, in the walking control method, when the upper body is detected to be in an upright state in which the upper body is generally parallel to the first leg and the second leg, the integrated correction amount may be cleared to be zero, and the first control signal and the second control signal may be regenerated.

According to this configuration, when the upper body is detected to be in the upright state in which the upper body is generally parallel to the first leg and the second leg, the integrated correction amount is cleared to be zero. Then, the first control signal and the second control signal are regenerated.

Accordingly, even when a deflection cycle temporarily changes due to an external force, it is possible to follow a changed deflection cycle to enable a lateral centroid shift to be smoothly continued.

Additionally, in the above walking control method, amounts of change in a stride of the first leg and the second leg caused by a synthesis of the first correction signal with the first control signal and with the second control signal may be stored, and the stored amounts of change may be added to the first control signal and the second control signal, and the stored amounts of change may be reduced with a lapse of time to be converged to zero.

According to this configuration, amounts of change in a stride of the first leg and the second leg caused by a synthesis of the first correction signal with the first control signal and with the second control signal are stored, and the stored amounts of change are added to the first control signal and the second control signal. Accordingly, an abrupt change in a stride occurring when the stored integrated correction amount is cleared to zero can be prevented. Additionally, the stored amount of change is reduced with the lapse of time to be converged to zero. Accordingly, the first control signal and the second control signal can be restored to a reference stride.

A non-transitory computer readable recording medium storing a walking control program according to another aspect of the present disclosure is a non-transitory computer readable recording medium storing a walking control program for controlling walking operation of a biped walking robot including an upper body, a first leg connected to the upper body, a second leg connected to the upper body, a first driving unit which drives the first leg, and a second driving unit which drives the second leg, the program causing a computer to function as an acquisition unit which acquires, during the walking operation of the biped walking robot, information indicative of an inclination angle of the upper body relative to the reference angle, the biped walking robot having a position of center of gravity being adjusted at a predetermined reference angle that enables the robot to be upright, and a control unit which causes, with one of the first leg and the second leg not being grounded due to the walking operation, the first leg and the second leg to operate such that the upper body is maintained within a predetermined angle range relative to the reference angle according to the inclination angle.

According to this configuration, the biped walking robot has a position of center of gravity adjusted at a predetermined reference angle that enables the robot to be upright. During walking operation of the biped walking robot, information indicative of an inclination angle of the upper body relative to the reference angle is acquired. With one of the first leg and the second leg not being grounded due to the walking operation, the first leg and the second leg are operated such that the upper body is maintained within a predetermined angle range relative to the reference angle according to the inclination angle.

Accordingly, since the upper body is maintained within a predetermined angle range relative to a predetermined reference angle that enables the robot to be upright with one of the first leg and the second leg not being grounded due to the walking operation, stable walking operation can be realized.

A biped walking robot according to another aspect of the present disclosure includes an upper body, a first leg connected to the upper body, a second leg connected to the upper body, a first driving unit which drives the first leg, a second driving unit which drives the second leg, an acquisition unit which acquires, during walking operation of the biped walking robot having a position of center of gravity being adjusted at a predetermined reference angle that enables the robot to be upright, information indicative of an inclination angle of the upper body relative to the reference angle, and a control unit which causes, with one of the first leg and the second leg not being grounded due to the walking operation, the first leg and the second leg to operate such that the upper body is maintained within a predetermined angle range relative to the reference angle according to the inclination angle.

According to this configuration, during walking operation of the biped walking robot having a position of center of gravity adjusted at a predetermined reference angle that enables the robot to be upright, information indicative of an inclination angle of the upper body relative to the reference angle is acquired. With one of the first leg and the second leg not being grounded due to walking operation, the first leg and the second leg are operated such that the upper body is maintained within a predetermined angle range relative to the reference angle according to the inclination angle.

Accordingly, since the upper body is maintained within a predetermined angle range relative to the reference angle that enables the robot to be upright, with one of the first leg and the second leg not being grounded due to walking operation, stable walking operation can be realized.

In the following, an embodiment of the present disclosure will be described with reference to the accompanying drawings. The following embodiment is merely an example that embodies the present disclosure and does not limit a technical range of the present disclosure.

In the above walking control method using a ZMP, sensing of a floor reaction force working point by a foot sole sensor is important for keeping balance. However, in person's biped walking, rather than a floor reaction force working point, postural reflex, in particular, involuntary reflex such as tonic labyrinthine reflex or tonic neck reflex among vestibular spinal reflexes plays an important role in keeping balance during walking. In the involuntary postural reflex, when a body inclines, a person tries to restore his or her balance by extending a leg on an inclination side and bending the other leg. Such a mechanism is crucial for realizing flexible balance control as of living things. In general, losing balance to fall is also considered to be a state in which an upper body is largely inclined. Thus, constantly keeping the upper body vertical prevents a person from falling.

Thus, in the present embodiment, when an upper body inclines during walking, inclination of the upper body is corrected to be vertical by superimposing a correction amount according to an inclination angle on a hip joint actuator in real time, thereby constantly controlling the upper body to be vertical.

FIG. 1 is a diagram showing a configuration of a biped walking robot in the present embodiment. A biped walking robot 1 shown in FIG. 1 includes an upper body 2, a first leg 3, a second leg 6, a walking control device 10, an inclination angle sensing unit 11, a first pitch axis actuator 12, a second pitch axis actuator 13, a first roll axis actuator 14 and a second roll axis actuator 15.

The upper body 2 imitates a human upper body (trunk). The first leg 3 imitates one of human legs and is connected to the upper body 2. The second leg 6 imitates the other of human legs and is connected to the upper body 2.

The first pitch axis actuator 12, the second pitch axis actuator 13, the first roll axis actuator 14 and the second roll axis actuator 15 are provided at a hip joint which connects the upper body 2, and the first leg 3 and the second leg 6. Although the biped walking robot 1 has knee joints and ankle joints other than the hip joint, no description will be made thereof because these joints are not related to walking operation of the present embodiment.

The first pitch axis actuator 12 rotatably drives the first leg 3 in a pitch direction (around a pitch axis). The second pitch axis actuator 13 rotatably drives the second leg 6 in the pitch direction (around the pitch axis).

The first roll axis actuator 14 rotatably drives the first leg 3 in a roll direction (around a roll axis). The second roll axis actuator 15 rotatably drives the second leg 6 in the roll direction (around the roll axis).

The inclination angle sensing unit 11 is, for example, a triaxial gyroscope and senses an inclination angle of the upper body 2 in the pitch direction and an inclination angle of the upper body 2 in the roll direction.

The walking control device 10 controls walking operation of the biped walking robot 1. The biped walking robot 1 has a position of center of gravity adjusted at a predetermined reference angle that enables the robot to be upright. The walking control device 10 causes the first leg 3 and the second leg 6 to operate such that the upper body 2 is maintained within a predetermined angle range relative to the reference angle according to an inclination angle of the upper body 2 in the pitch direction sensed by the inclination angle sensing unit 11.

First, description will be made of the walking control device which controls walking operation in the pitch direction (a front-rear direction) in the present embodiment.

Figure 2:
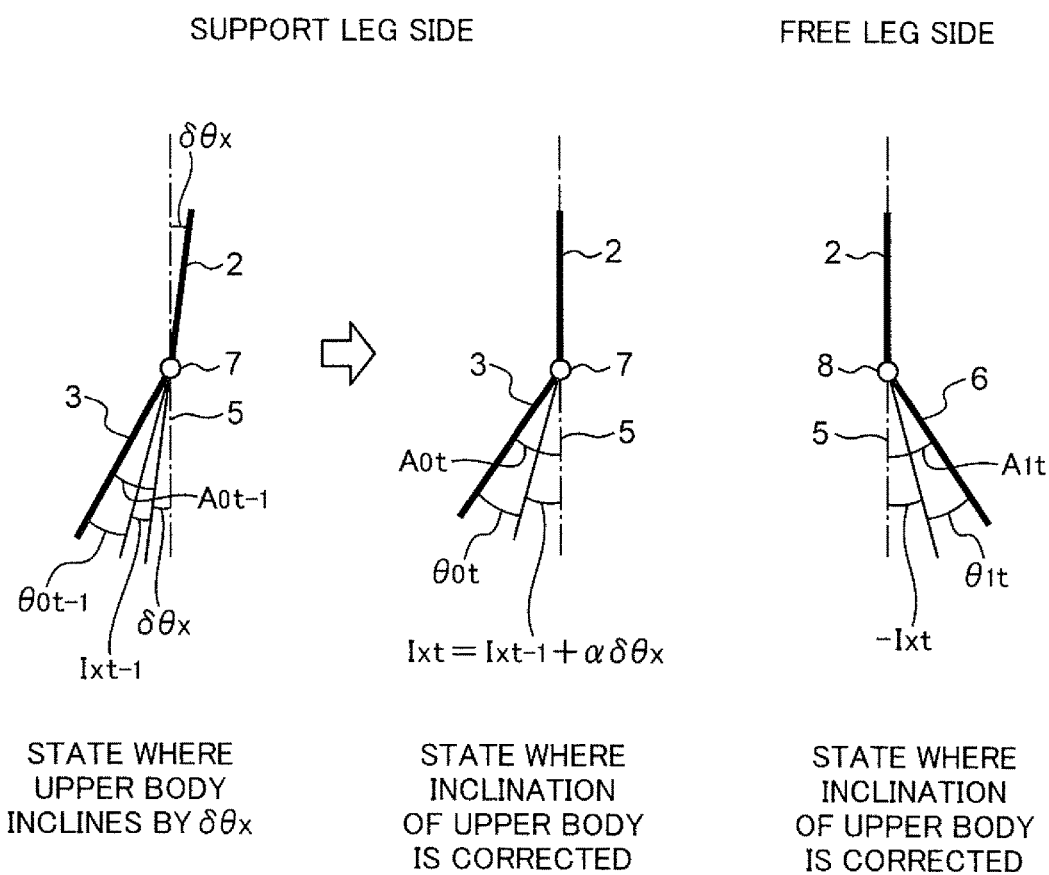
FIG. 2 is a schematic diagram for explaining walking control of the biped walking robot in a pitch direction in the present embodiment.

FIG. 2 is a schematic diagram for explaining walking control of a biped walking robot in the pitch direction in the present embodiment. In FIG. 2, the biped walking robot 1 is seen from the side. In FIG. 2, the upper body 2 and the first leg 3 are connected by a hip joint 7, the upper body 2 and the second leg 6 are connected by a hip joint 8, and the hip joint 7 and the hip joint 8 are each provided with an actuator which is rotatably driven around the pitch axis. For example, the first leg 3 is a support leg touching the ground when walking and the second leg 6 is a free leg not touching the ground when walking.

Here, a change of angles of the hip joints 7, 8 by the actuators is linked to a change of an inclination angle of the upper body 2 in a gravity direction.

In general, an actuator is controlled at a time interval of approximately 10 ms. At a certain time t, when an inclination angle of the upper body 2 in the pitch direction relative to a vertical line 5 is $\delta\theta x$ and a pitch axis hip joint angle on a support leg side in basic walking motion is $\theta_{0t-1}$, a pitch axis hip joint angle $A_{0t}$ on the support leg side to be updated is calculated ($A_{0t} = \theta_{0t} + I_{xt}$) by adding a control amount $\theta_{0t}$ of the basic walking motion at time t to a value $I_{xt} = I_{xt-1} + \alpha\delta\theta x$) obtained by adding an inclination correction amount $\alpha\delta\theta x$ ($\alpha$ is a coefficient) to a previous integrated value $I_{xt-1}$.

Additionally, although a pitch axis hip joint angle $A_{1t}$ on a free leg side is also calculated by the same processing as the pitch axis hip joint angle $A_{0t}$ on the support leg side, a sign of the value $I_{xt}$ will be opposite. Therefore, the pitch axis hip joint angle $A_{1t}$ on the free leg side to be updated is calculated ($A_{1t} = \theta_{1t} - I_{xt}$) by subtracting the value $I_{xt}$ (=$I_{xt-1}$+ $\alpha\delta\theta x$) obtained by adding the inclination correction amount $\alpha\delta\theta x$ ($\alpha$ is a coefficient) to the previous integrated value $I_{xt-1}$ from a control amount $\theta_{1t}$ of the basic walking motion at time t.

A method of minimizing the inclination angle $\delta\theta x$ corresponds to an integration term of PID (Proportional-Integral-Differential) control and $I_{xt}=I_{xt-1}+\alpha\delta\theta x$ corresponds to an integration term of the same. The technique recited in Patent Literature 1 uses a proportional term for PID control.

Subsequently, description will be made of the walking control device which controls walking operation in the pitch direction in the present embodiment.

Figure 3:
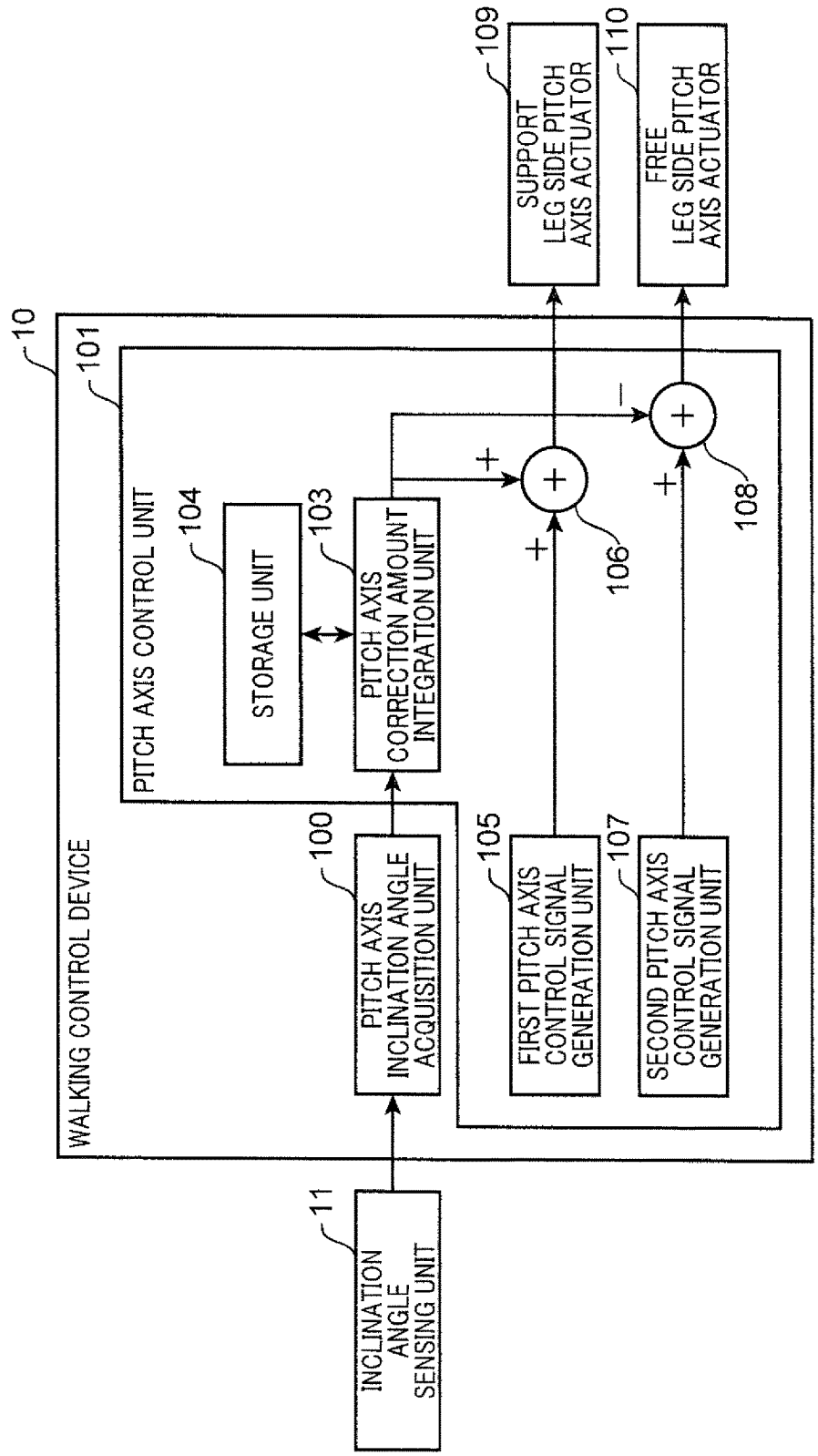
FIG. 3 is a diagram showing a configuration of a walking control device which controls walking operation in the pitch direction in the present embodiment.

FIG. 3 is a diagram showing a configuration of the walking control device which controls walking operation in the pitch direction in the present embodiment.

The walking control device 10 includes a pitch axis inclination angle acquisition unit 100 and a pitch axis control unit 101.

The pitch axis inclination angle acquisition unit 100 acquires information indicative of an inclination angle of the upper body 2 relative to a reference angle in the walking operation of the biped walking robot 1. The pitch axis inclination angle acquisition unit 100 acquires the inclination angle $\delta\theta x$ of the upper body 2 in the pitch direction, the angle being sensed by the inclination angle sensing unit 11.

With one of the first leg 3 and the second leg 6 not grounded due to the walking operation, the pitch axis control unit 101 causes the first leg 3 and the second leg 6 to operate such that the upper body 2 is maintained within a predetermined angle range relative to a reference angle according to an inclination angle. In particular, with one of the first leg 3 and the second leg 6 not grounded due to the walking operation, the pitch axis control unit 101 causes the first leg 3 and the second leg 6 to operate such that the upper body 2 is maintained within a predetermined angle range relative to the reference angle according to the inclination angle in the pitch direction.

The pitch axis control unit 101 includes a pitch axis correction amount integration unit 103, a storage unit 104, a first pitch axis control signal generation unit 105, a first synthesis unit 106, a second pitch axis control signal generation unit 107 and a second synthesis unit 108.

When the first leg 3 and the second leg 6 are operated so as to maintain the upper body 2 within a predetermined angle range relative to the reference angle, the pitch axis correction amount integration unit 103 generates, based on the inclination angle $\delta\theta x$ in the pitch direction, a first pitch axis correction signal for correcting operation of each of the first leg 3 and the second leg 6 in order to maintain the upper body 2 within a predetermined angle range relative to the reference angle. The pitch axis correction amount integration unit 103 generates the first pitch axis correction signal by adding, to an integrated correction amount $I_x$ that has been integrated before the first correction amount is calculated, the first correction amount calculated for maintaining the upper body 2 within a predetermined angle range relative to the reference angle based on the inclination angle $\delta\theta x$ in the pitch direction. The first correction amount and the integrated correction amount are calculated based on an inclination angle in the front-rear direction (pitch direction) of the biped walking robot 1.

The pitch axis correction amount integration unit 103 calculates the first correction amount by a first function $f_1(\delta\theta x)$ which uses the inclination angle $\delta\theta x$ at a predetermined time point as a variable. The first function $f_1(\delta\theta x)$ may be a function ($\alpha\delta\theta x$) which is obtained by multiplying the inclination angle $\delta\theta x$ by a predetermined coefficient $\alpha$ or may be a function ($\alpha\cdot\sin(\delta\theta x)$) obtained by multiplying a sine function of the inclination angle $\delta\theta x$ by the predetermined coefficient $\alpha$.

As described above, the first pitch axis correction signal is represented by the integrated correction amount $I_x$ $(=I_x+f_1(\delta\theta x))$.

The storage unit 104 stores the integrated correction amount $I_x$ calculated by the pitch axis correction amount integration unit 103.

The first pitch axis control signal generation unit 105 generates a first pitch axis control signal for causing a support leg, either the first leg 3 or the second leg 6, to conduct walking operation. The first pitch axis control signal generation unit 105 generates the first pitch axis control signal with an angle $\theta_0$ as a control amount, the angle at which the support leg is rotated around the hip joint in the pitch direction.

The first synthesis unit 106 generates a third pitch axis control signal ($A_0$) which is a synthesis of the first pitch axis control signal ($\theta_0$) and the first pitch axis correction signal ($I_x$), and outputs the third pitch axis control signal to a support leg side pitch axis actuator 109 which drives one of the first leg 3 and the second leg 6, which serves as a support leg. The first synthesis unit 106 generates the third pitch axis control signal by adding the first pitch axis correction signal to the first pitch axis control signal.

The support leg side pitch axis actuator 109 is either the first pitch axis actuator 12 or the second pitch axis actuator 13, and rotatably drives a leg as a support leg, either the first leg 3 or the second leg 6, in the pitch direction based on the third pitch axis control signal.

The second pitch axis control signal generation unit 107 generates a second pitch axis control signal for causing a free leg, either the first leg 3 or the second leg 6, to conduct walking operation. The second pitch axis control signal generation unit 107 generates the second pitch axis control signal with an angle $\theta_1$ as a control amount, the angle at which the free leg is rotated around the hip joint in the pitch direction.

The second synthesis unit 108 generates a fourth pitch axis control signal ($A_1$) which is a synthesis of the second pitch axis control signal ($\theta_1$) and the first pitch axis correction signal ($I_x$), and outputs the fourth pitch axis control signal to a free leg side pitch axis actuator 110 which drives the other of the first leg 3 and the second leg 6, which serves as a free leg. The second synthesis unit 108 generates the fourth pitch axis control signal by subtracting the first pitch axis correction signal from the second pitch axis control signal.

Thus, based on the first correction signal, the first synthesis unit 106 and the second synthesis unit 108 correct the first pitch axis control signal and the second pitch axis control signal which are for causing the first leg 3 and the second leg 6 to conduct walking operation, and output the corrected third pitch axis control signal and fourth pitch axis control signal to the first pitch axis actuator 12 which drives the first leg 3 and to the second pitch axis actuator 13 which drives the second leg 6, respectively.

The free leg side pitch axis actuator 110 is one of the first pitch axis actuator 12 and the second pitch axis actuator 13, and rotatably drives a leg as a free leg, either the first leg 3 or the second leg 6, in the pitch direction based on the fourth pitch axis control signal.

Thus, by setting a sign of the first pitch axis correction signal $I_x$ to be positive, which signal is to be added to the first pitch axis control signal $\theta_0$, and setting a sign of the first pitch axis correction signal $I_x$ to be negative, which signal is to be added to the second pitch axis control signal $\theta_1$, such that the first pitch axis correction signals $I_x$ to be added have signs opposite to each other, a position of center of gravity of the biped walking robot 1 can be constantly maintained at the center of a stride even when the stride changes.

When the biped walking robot 1 is supported by both the first leg 3 and the second leg 6, the first synthesis unit 106 and the second synthesis unit 108 do not need to calculate the first correction amount. In this case, since no first correction amount is calculated, an integrated correction amount is fixed. Therefore, the first synthesis unit 106 generates the third pitch axis control signal which is a synthesis of the first pitch axis control signal and the first pitch axis correction signal indicative of an integrated correction amount stored in the storage unit 104. Additionally, the second synthesis unit 108 generates the fourth pitch axis control signal which is a synthesis of the second pitch axis control signal and the first pitch axis correction signal indicative of an integrated correction amount stored in the storage unit 104.

Subsequently, description will be made of walking operation of the walking control device in the pitch direction in the present embodiment.

Figure 4:
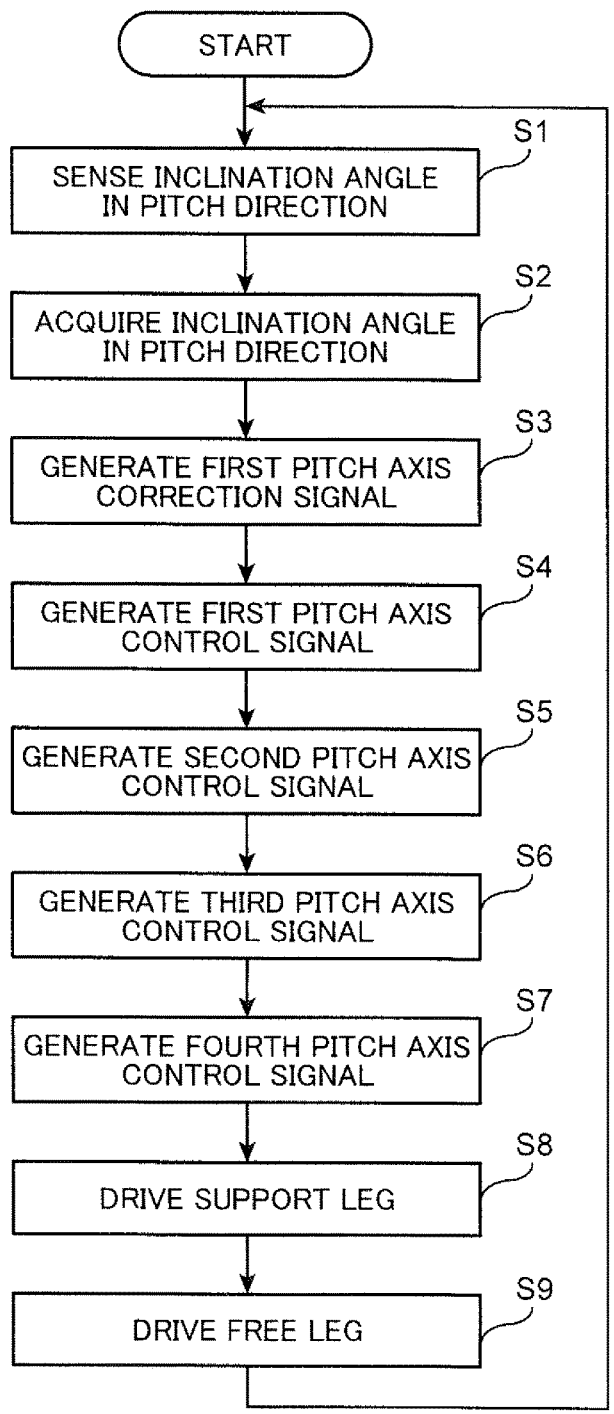
FIG. 4 is a flow chart for explaining walking operation in the pitch direction by the walking control device in the present embodiment.

FIG. 4 is a flow chart for explaining the walking operation in the pitch direction by the walking control device in the present embodiment.

First, in step S1, the inclination angle sensing unit 11 senses an inclination angle of the upper body 2 in the pitch direction relative to the vertical line.

Next, in step S2, the pitch axis inclination angle acquisition unit 100 acquires the inclination angle in the pitch direction sensed by the inclination angle sensing unit 11.

Next, in step S3, the pitch axis correction amount integration unit 103 generates the first pitch axis correction signal by adding, to an integrated correction amount that has been integrated before the first correction amount is calculated, the first correction amount calculated for maintaining the upper body 2 within a predetermined angle range relative to the reference angle based on the acquired inclination angle in the pitch direction. The pitch axis correction amount integration unit 103 stores the integrated correction amount in the storage unit 104, as well as outputting the generated first pitch axis correction signal to the first synthesis unit 106 and to the second synthesis unit 108.

Next, in step S4, the first pitch axis control signal generation unit 105 generates the first pitch axis control signal for causing a support leg, either the first leg 3 or the second leg 6, to conduct walking operation in the pitch direction.

Next, in step S5, the second pitch axis control signal generation unit 107 generates the second pitch axis control signal for causing a free leg, either the first leg 3 or the second leg 6, to conduct walking operation in the pitch direction.

Next, in step S6, the first synthesis unit 106 generates the third pitch axis control signal obtained by adding, to the first pitch axis control signal generated by the first pitch axis control signal generation unit 105, the first pitch axis correction signal generated by the pitch axis correction amount integration unit 103. The first synthesis unit 106 outputs the generated third pitch axis control signal to the support leg side pitch axis actuator 109 which drives a leg as a support leg, either the first leg 3 or the second leg 6.

Next, in step S7, the second synthesis unit 108 generates the fourth pitch axis control signal as a result of subtraction of the first pitch axis correction signal generated by the pitch axis correction amount integration unit 103 from the second pitch axis control signal generated by the second pitch axis control signal generation unit 107. The second synthesis unit 108 outputs the generated fourth pitch axis control signal to the free leg side pitch axis actuator 110 which drives a leg as a free leg, either the first leg 3 or the second leg 6.

Next, in step S8, the support leg side pitch axis actuator 109 drives a leg as a support leg, either the first leg 3 or the second leg 6, based on the third pitch axis control signal generated by the first synthesis unit 106.

Next, in step S9, the free leg side pitch axis actuator 110 drives a leg as a free leg, either the first leg 3 or the second leg 6, based on the fourth pitch axis control signal generated by the second synthesis unit 108. Thereafter, returning to the processing of step S1, the walking operation in the pitch direction by the walking control device 10 is controlled.

Thus, according to the basic walking motion, the actuators corresponding to pitch axes of the hip joint, the knee joints and the ankle joints are driven while a support leg and a free leg are alternately switched. At this time, when the upper body inclines by $\delta\theta x$ toward the pitch axis relative to the vertical line, $\alpha\delta\theta x$ obtained by multiplying $\delta\theta x$ by the coefficient $\alpha$ is added to the integrated correction amount $I_x$, and an integrated correction amount $I_x$ ($=I_x+\alpha\delta\theta x$) is added to hip joint pitch axis drive amounts $\theta_0$, $\theta_1$ of both the legs which follow the basic walking motion.

The pitch axis control unit 101 may further include a first determination unit which determines whether or not a first driving amount of the first leg 3 or the second leg 6 based on the third pitch axis control signal exceeds a first threshold value, a second determination unit which determines whether or not a second driving amount of the first leg 3 or the second leg 6 based on the fourth pitch axis control signal exceeds the first threshold value, a first change unit which changes the first driving amount to the first threshold value when determination is made that the first driving amount exceeds the first threshold value, and a second change unit which changes the second driving amount to the first threshold value when determination is made that the second driving amount exceeds the first threshold value.

At this time, the first determination unit and the first change unit may change a sign of the first threshold value in accordance with a sign of the first driving amount, and the second determination unit and the second change unit may change the sign of the first threshold value in accordance with a sign of the second driving amount. Additionally, the first determination unit may compare an absolute value of the first driving amount with the first threshold value and the second determination unit may compare an absolute value of the second driving amount with the first threshold value.

Subsequently, description will be made of the walking control device which controls walking operation in the roll direction (right-left direction) in the present embodiment.

When a stance phase where a leg touches a floor is switched to a swing phase where a leg is off the floor, or when the swing phase is switched to the stance phase during walking, stable centroid shift should be conducted in the right-left direction.

In a state of walking, since a space between right and left legs is smaller than a space (stride) between front and rear legs, unless centroid shift in the right-left direction synchronizes with the time of lifting a leg at the moment at which the stance phase is shifted to the swing phase, lateral balance might be disturbed to thereby cause fall.

For realizing stable centroid shift in a lateral direction, a deflection range d and a cycle $\tau$ should be set to match a body of each robot, however, only with such setting, it is difficult to maintain stable centroid shift in the right-left direction due to an effect such as an external interference, a structural looseness of the robot itself, or a disturbance.

Here, in the present embodiment, relative to lateral basic walking motion which realizes cyclic centroid shift in a lateral direction, walking operation is stabilized by correcting a lateral inclination so as to make the upper body vertical.

Figure 5:
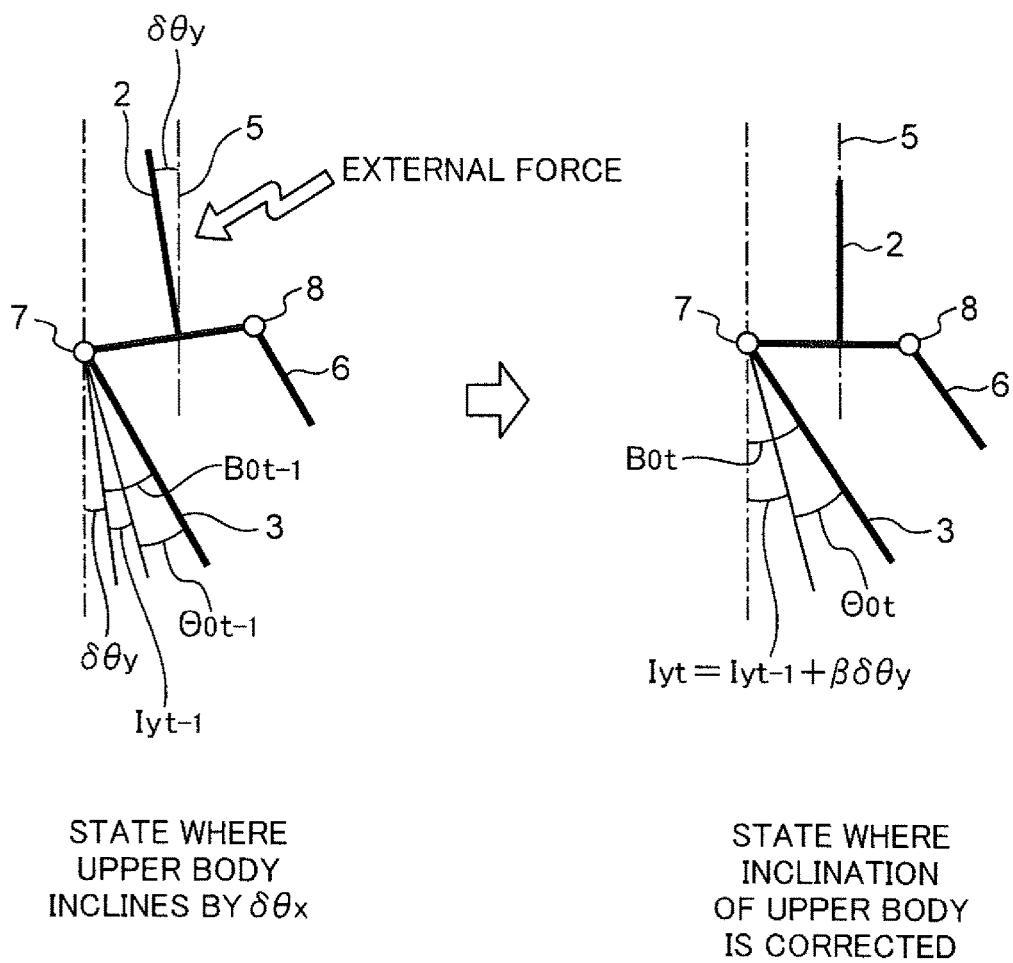
FIG. 5 is a schematic diagram for explaining walking control of the biped walking robot in a roll direction in the present embodiment.

FIG. 5 is a schematic diagram for explaining walking control of the biped walking robot in the roll direction in the present embodiment. In FIG. 5, the biped walking robot 1 is seen from the front. In FIG. 5, the upper body 2 and the first leg 3 are connected by the hip joint 7, the upper body 2 and the second leg 6 are connected by the hip joint 8, and the hip joint 7 and the hip joint 8 are each provided with an actuator for rotatably driving around the roll axis. For example, the first leg 3 is a support leg which touches the ground when walking and the second leg 6 is a free leg which does not touch the ground when walking.

At a certain time t, when an inclination angle of the upper body 2 in the right-left direction (roll direction) relative to the vertical line 5 is $\delta\theta y$, and a roll axis hip joint angle on the support leg side in the basic walking motion is $\Theta_{0t-1}$, a roll axis hip joint angle $B_{0t}$ on the support leg side to be updated is calculated by adding a control amount $\Theta_{0t}$ in the basic walking motion at time t to a value $I_{yt}$ ($=I_{yt\_1}+\beta\delta\theta y$) which is obtained by adding an inclination correction amount $\beta\delta\theta y$ ($\beta$ is a coefficient) to a previous integrated value $I_{yt-1}$.

Additionally, a roll axis hip joint angle $B_{1t}$ on the free leg side is calculated ($B_{1t}=\Theta_{1t}+\gamma I_{yt}$) by adding a product of an integrated value $I_{yt}$ and a coefficient $\gamma$ to a roll axis hip joint angle $\Theta_{1t}$ in the basic walking motion at time t. When the coefficient $\gamma$ is 1, even when correction is made due to an inclination, the free leg and the support leg are driven in parallel to each other in the lateral direction, resulting in having a stable gait suitable for walking on a floor with reduced undulations. On the other hand, when the coefficient $\gamma$ has a negative value, upon correction made due to an inclination, the free leg and the support leg are driven opposite to each other in the lateral direction, so that it is easy to keep balance even on an irregular ground.

Figure 6:
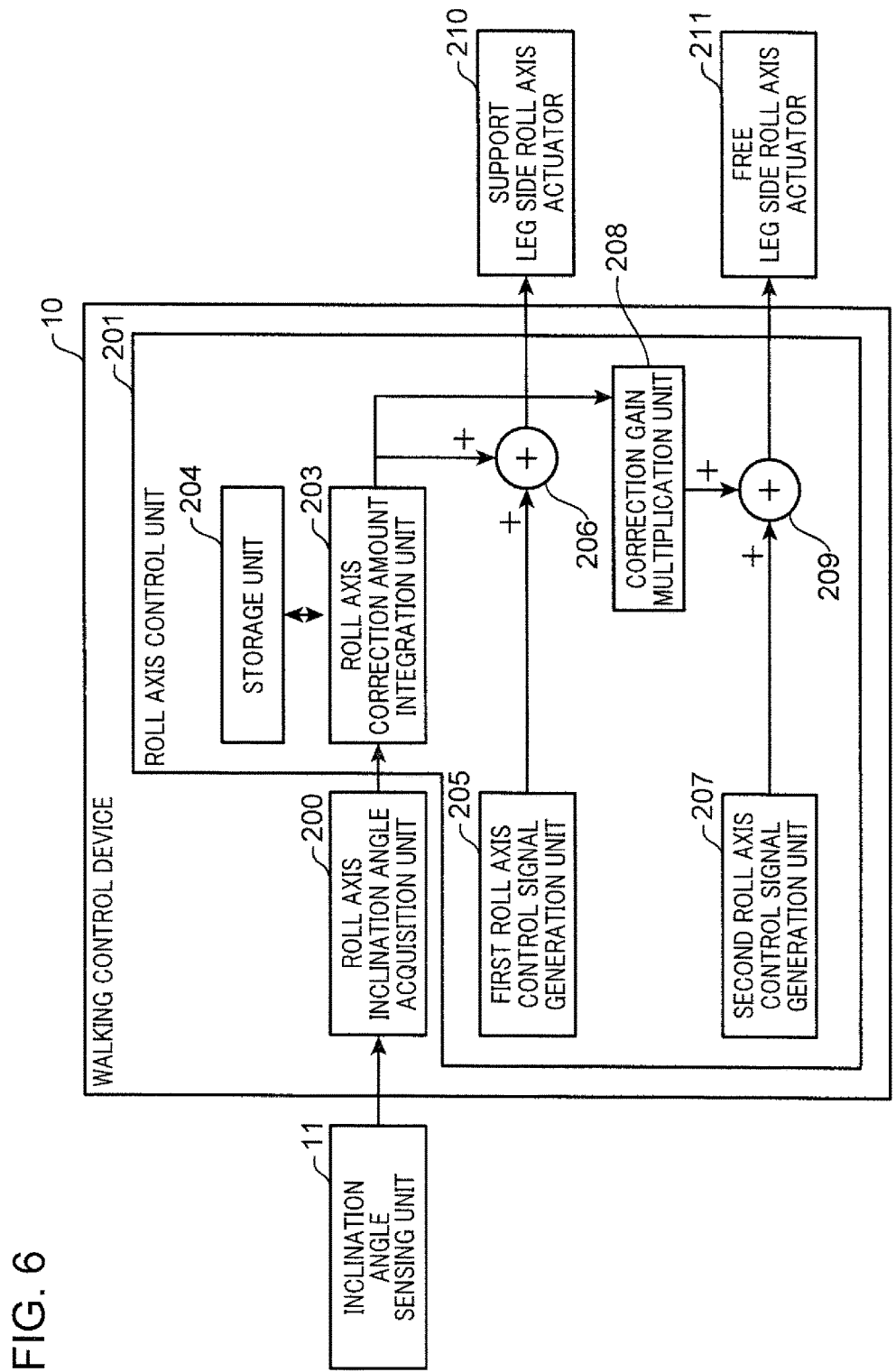
FIG. 6 is a diagram showing a configuration of a walking control device which controls walking operation in the roll direction in the present embodiment.

FIG. 6 is a diagram showing a configuration of the walking control device which controls walking operation in the roll direction in the present embodiment.

The walking control device 10 includes a roll axis inclination angle acquisition unit 200 and a roll axis control unit 201.

The roll axis inclination angle acquisition unit 200 acquires information indicative of an inclination angle of the upper body 2 relative to a reference angle in walking operation of the biped walking robot 1. The roll axis inclination angle acquisition unit 200 acquires the inclination angle $\delta\theta y$ of the upper body 2 in the roll direction, which angle is sensed by the inclination angle sensing unit 11.

With one of the first leg 3 and the second leg 6 is not grounded due to the walking operation, the roll axis control unit 201 causes the first leg 3 and the second leg 6 to operate such that the upper body 2 is maintained within a predetermined angle range relative to a reference angle according to an inclination angle. In particular, with one of the first leg 3 and the second leg 6 is not grounded due to the walking operation, the roll axis control unit 201 causes the first leg 3 and the second leg 6 to operate such that the upper body 2 is maintained within a predetermined angle range relative to a reference angle according to an inclination angle in the roll direction.

The roll axis control unit 201 includes a roll axis correction amount integration unit 203, a storage unit 204, a first roll axis control signal generation unit 205, a first synthesis unit 206, a second roll axis control signal generation unit 207, a correction gain multiplication unit 208 and a second synthesis unit 209.

The roll axis correction amount integration unit 203 generates a first roll axis correction signal for correcting each operation of the first leg 3 and the second leg 6 such that the upper body 2 is maintained within a predetermined angle range relative to a reference angle based on the inclination angle $\delta\theta y$ in the roll direction when the first leg 3 and the second leg 6 are operated such that the upper body 2 is maintained within the predetermined angle range relative to the reference angle. The roll axis correction amount integration unit 203 generates the first roll axis correction signal by adding the first correction amount calculated in order to maintain the upper body 2 within the predetermined angle range relative to the reference angle based on the inclination angle $\delta\theta y$ in the roll direction to an integrated correction amount $I_y$ integrated before the first correction amount is calculated. The first correction amount and the integrated correction amount are calculated based on an inclination angle of the biped walking robot 1 in the right-left direction (roll direction).

The roll axis correction amount integration unit 203 calculates the first correction amount by a first function $f_1(\delta\theta y)$ with the inclination angle $\delta\theta y$ at a predetermined time point as a variable. The first function $f_1(\delta\theta y)$ may be the function ($\beta\delta\theta y$) obtained by multiplying the inclination angle $\delta\theta y$ by a predetermined coefficient $\beta$, or may be a function ($\beta\cdot\sin(\delta\theta y)$) obtained by multiplying a sine function of the inclination angle $\delta\theta y$ by the predetermined coefficient $\beta$.

As described above, the first roll axis correction signal is represented by an integrated correction amount $I_y(=I_y+f_1(\delta\theta y))$.

The storage unit 204 stores the integrated correction amount $I_y$ calculated by the roll axis correction amount integration unit 203.

The first roll axis control signal generation unit 205 generates a first roll axis control signal for causing a support leg, either the first leg 3 or the second leg 6, to conduct walking operation. The first roll axis control signal generation unit 205 generates the first roll axis control signal with an angle $\Theta_0$ as a control amount, the angle at which the support leg is rotated in the roll direction with the hip joint as a center.

The first synthesis unit 206 generates a third roll axis control signal ($B_0$) as a synthesis of the first roll axis control signal ($\Theta_0$) and the first roll axis correction signal ($I_y$) and outputs the third roll axis control signal to a support leg side roll axis actuator 210 which drives one of the first leg 3 and the second leg 6, which serves as a support leg. The first synthesis unit 206 generates the third roll axis control signal by adding the first roll axis correction signal to the first roll axis control signal.

The support leg side roll axis actuator 210 is either the first roll axis actuator 14 or the second roll axis actuator 15, and rotatably drives a leg as a support leg, either the first leg 3 or the second leg 6, in the roll direction based on the third roll axis control signal.

The second roll axis control signal generation unit 207 generates a second roll axis control signal for causing a free leg, either the first leg 3 or the second leg 6, to conduct walking operation. The second roll axis control signal generation unit 207 generates the second roll axis control signal with an angle $\Theta_1$ as a control amount, the angle at which the free leg is rotated in the roll direction with the hip joint as the center.

The correction gain multiplication unit 208 generates a second roll axis correction signal ($\gamma I_y$) by multiplying the first roll axis correction signal ($I_y$) by a predetermined coefficient ($\gamma$).

When a value indicating irregularities of a surface on which the biped walking robot 1 walks is not more than a predetermined value, the correction gain multiplication unit 208 sets the predetermined coefficient $\gamma$ to be a positive value. In this case, the biped walking robot 1 includes a sensor which converts irregularities of a walking surface into numerical values and senses the same. When the coefficient $\gamma$ is, for example, 1, this enables the free leg and the support leg to be driven in parallel to each other in the lateral direction even if correction is made due to an inclination, resulting in having a stable gait suitable for walking on a floor with reduced undulations. Additionally, when the value indicating irregularities of a surface on which the biped walking robot 1 walks is more than the predetermined value, the correction gain multiplication unit 208 sets the predetermined coefficient $\gamma$ to be a negative value. This makes it possible to easily keep balance even on an irregular ground because when correction is made due to an inclination, the free leg and the support leg are driven opposite to each other in the lateral direction.

The second synthesis unit 209 generates a fourth roll axis control signal ($B_1$) as a synthesis of the second roll axis control signal ($\Theta_1$) and the second roll axis correction signal ($\gamma I_y$) and outputs the fourth roll axis control signal to a free leg side roll axis actuator 211 which drives the other of the first leg 3 and the second leg 6, which serves as a free leg. The second synthesis unit 209 generates the fourth roll axis control signal by adding, to the second roll axis control signal, the second roll axis correction signal obtained by multiplying the first roll axis correction signal by a predetermined coefficient.

The free leg side roll axis actuator 211 is either the first roll axis actuator 14 or the second roll axis actuator 15, and rotatably drives a leg as a free leg, either the first leg 3 or the second leg 6, in the roll direction based on the fourth roll axis control signal.

Thus, while the first roll axis control signal generation unit 205 and the second roll axis control signal generation unit 207 sequentially generate the first roll axis control signal $\Theta_0$ and the second roll axis control signal $\Theta_1$ as driving patterns, the upper body 2 can be vertically maintained by superimposing the first roll axis correction signal $I_y$ and the second roll axis correction signal $\gamma I_y$ as inclination correction amounts on the first roll axis control signal $\Theta_0$ and the second roll axis control signal $\Theta_1$.

Additionally, when the upper body 2 is detected to be in an upright state in which the upper body 2 is substantially parallel to the first leg 3 and the second leg 6, the roll axis correction amount integration unit 203 may clear the integrated correction amount stored in the storage unit 204 to be zero. Then, the first roll axis control signal generation unit 205 may regenerate the first roll axis control signal and the second roll axis control signal generation unit 207 may regenerate the second roll axis control signal. This makes it possible to follow a changed deflection cycle even when a deflection cycle temporarily changes due to an external force, whereby a lateral centroid shift is smoothly continued. When the first roll axis control signal and the second roll axis control signal are regenerated, an order of switching between a support leg and a free leg is maintained of the right and left legs.

Additionally, the first roll axis control signal generation unit 205 and the second roll axis control signal generation unit 207 may store amounts of change in a stride of the first leg 3 and the second leg 6 caused by a synthesis of the first roll axis correction signal with the first roll axis control signal and a synthesis of the second roll axis correction signal with the second roll axis control signal. The first roll axis control signal generation unit 205 adds the stored amount of change to the first roll axis control signal. The second roll axis control signal generation unit 207 adds the stored amount of change to the second roll axis control signal. This prevents an abrupt change in a stride which occurs when the integrated correction amount stored in the storage unit 204 is cleared to zero. Additionally, the first roll axis control signal generation unit 205 and the second roll axis control signal generation unit 207 reduce the stored amounts of change with the lapse of time to be converged to zero. Accordingly, the first roll axis control signal and the second roll axis control signal can be restored to a reference stride.

Additionally, when the biped walking robot 1 is supported by both the first leg 3 and the second leg 6, the first synthesis unit 206 and the second synthesis unit 209 do not need to calculate the first correction amount. In this case, since the first correction amount is not calculated, an integrated correction amount is fixed. Therefore, the first synthesis unit 206 generates the third roll axis control signal which is a synthesis of the first roll axis control signal and the first roll axis correction signal indicative of an integrated correction amount stored in the storage unit 204. Additionally, the second synthesis unit 209 generates the fourth roll axis control signal which is a synthesis of the second roll axis control signal and the first roll axis correction signal indicative of the integrated correction amount stored in the storage unit 204.

Subsequently, description will be made of walking operation in the roll direction by the walking control device in the present embodiment.

Figure 7:
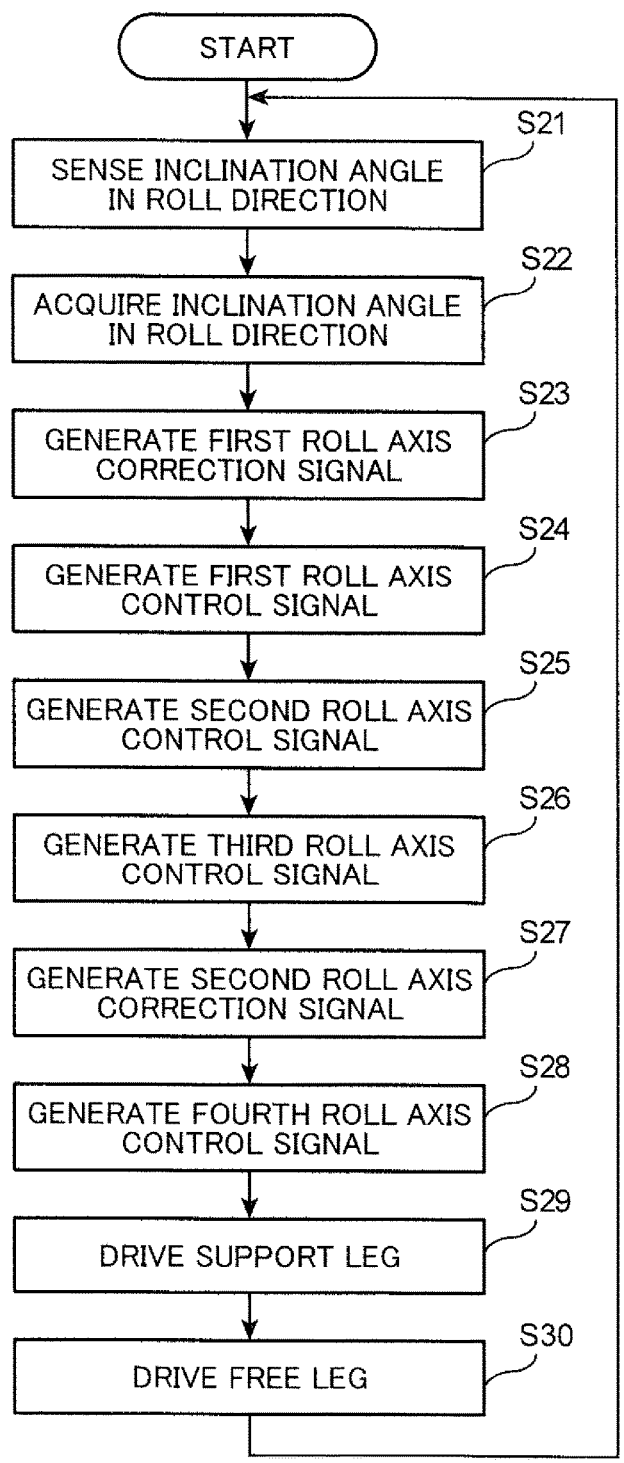
FIG. 7 is a flow chart for explaining walking operation in the roll direction by the walking control device in the present embodiment.

FIG. 7 is a flow chart for explaining walking operation in the roll direction by the walking control device in the present embodiment.

First, in step S21, the inclination angle sensing unit 11 senses an inclination angle of the upper body 2 in the roll direction relative to the vertical line.

Next, in step S22, the roll axis inclination angle acquisition unit 200 acquires the inclination angle in the roll direction sensed by the inclination angle sensing unit 11.

Next, in step S23, the roll axis correction amount integration unit 203 generates the first roll axis correction signal by adding, to an integrated correction amount that has been integrated before the first correction amount is calculated, the first correction amount calculated for maintaining the upper body 2 within a predetermined angle range relative to the reference angle based on the acquired inclination angle in the roll direction. The roll axis correction amount integration unit 203 stores the integrated correction amount in the storage unit 204, as well as outputting the generated first roll axis correction signal to the first synthesis unit 206 and to the correction gain multiplication unit 208.

Next, in step S24, the first roll axis control signal generation unit 205 generates the first roll axis control signal for causing a support leg, either the first leg 3 or the second leg 6, to conduct walking operation in the roll direction.

Next, in step S25, the second roll axis control signal generation unit 207 generates the second roll axis control signal for causing a free leg, either the first leg 3 or the second leg 6, to conduct walking operation in the roll direction.

Next, in step S26, the first synthesis unit 206 generates the third roll axis control signal which is obtained by adding the first roll axis correction signal generated by the roll axis correction amount integration unit 203 to the first roll axis control signal generated by the first roll axis control signal generation unit 205. The first synthesis unit 206 outputs the generated third roll axis control signal to the support leg side roll axis actuator 210 which drives a leg that serves as a support leg, either the first leg 3 or the second leg 6.

Next, in step S27, the correction gain multiplication unit 208 generates the second roll axis correction signal which is obtained by multiplying the first roll axis correction signal generated by the roll axis correction amount integration unit 203 by a predetermined coefficient. The correction gain multiplication unit 208 outputs the generated second roll axis correction signal to the second synthesis unit 209.

Next, in step S28, the second synthesis unit 209 generates the fourth roll axis control signal which is obtained by adding the second roll axis correction signal generated by the correction gain multiplication unit 208 to the second roll axis control signal generated by the second roll axis control signal generation unit 207. The second synthesis unit 209 outputs the generated fourth roll axis control signal to the free leg side roll axis actuator 211 which drives a leg that serves as a free leg, either the first leg 3 or the second leg 6.

Next, in step S29, the support leg side roll axis actuator 210 drives a leg serving as a support leg, either the first leg 3 or the second leg 6, based on the third roll axis control signal generated by the first synthesis unit 206.

Next, in step S30, the free leg side roll axis actuator 211 drives a leg serving as a free leg, either the first leg 3 or the second leg 6, based on the fourth roll axis control signal generated by the second synthesis unit 209. Thereafter, returning to the processing of step S21, the walking operation in the roll direction by the walking control device 10 is controlled.

The roll axis control unit 201 may further include a first determination unit which determines whether or not a first driving amount of the first leg 3 or the second leg 6 based on the third roll axis control signal exceeds a second threshold value interfered by the first leg 3 and the second leg 6, a second determination unit which determines whether or not a second driving amount of the first leg 3 or the second leg 6 based on the fourth roll axis control signal exceeds the second threshold value, a first change unit which changes the first driving amount to a predetermined value smaller than the second threshold value when determination is made that the first driving amount exceeds the second threshold value, and a second change unit which changes the second driving amount to a predetermined value smaller than the second threshold value when determination is made that the second driving amount exceeds the second threshold value.

At this time, the first determination unit and the first change unit may change a sign of the second threshold value in accordance with a sign of the first driving amount, and the second determination unit and the second change unit may change the sign of the second threshold value in accordance with a sign of the second driving amount. Additionally, the first determination unit may compare an absolute value of the first driving amount with the second threshold value, and the second determination unit may compare an absolute value of the second driving amount with the second threshold value.

Here, description will be made of a difference between conventional walking control and the walking control in the present embodiment.

Figure 8:
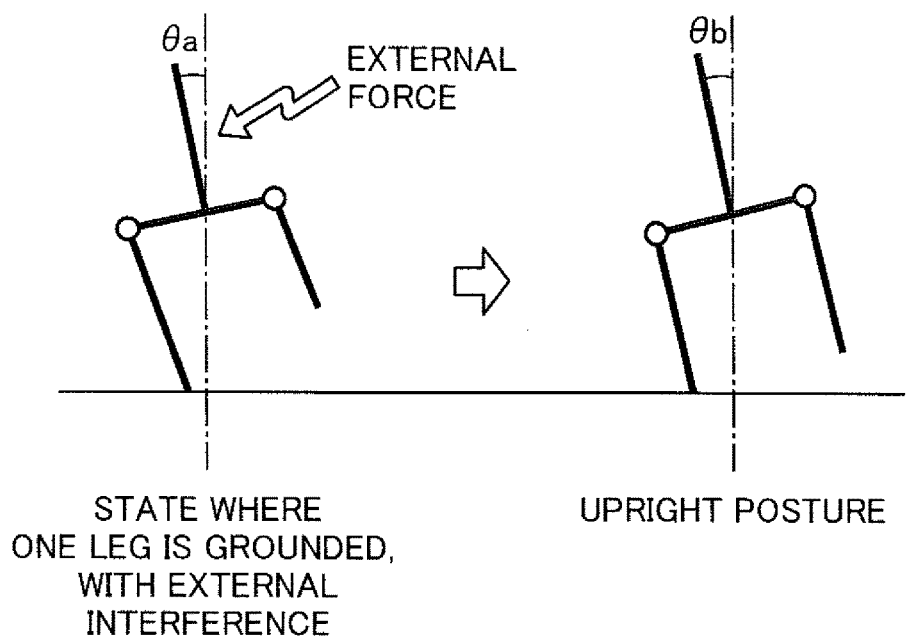
FIG. 8 is a schematic diagram for explaining conventional walking control conducted when an upper body inclines due to an external force.
Figure 9:
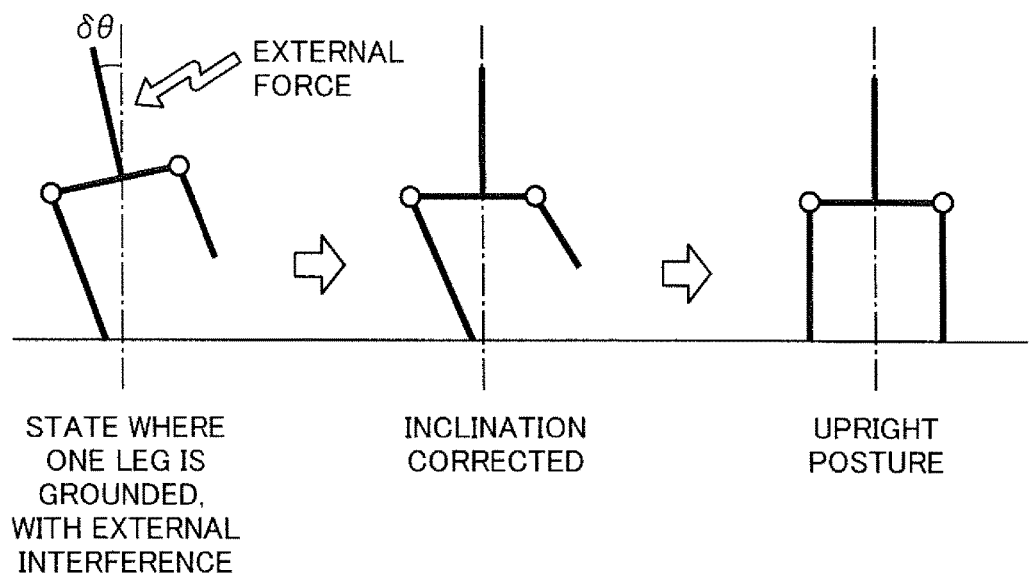
FIG. 9 is a schematic diagram for explaining walking control conducted when an upper body inclines due to an external force in the present embodiment.

FIG. 8 is a schematic diagram for explaining conventional walking control conducted when an upper body inclines due to an external force, and FIG. 9 is a schematic diagram for explaining walking control conducted when an upper body inclines due to an external force in the present embodiment.

As shown in FIG. 8, with a conventional walking control device, for example, when a biped walking robot is laterally applied with an external force, with one leg grounded, and then restores an upright state with an upper body thereof inclined at an angle of θa degrees, the inclination might not be restored to thus remain or might be further increased, possibly causing the biped walking robot to fall.

On the other hand, as shown in FIG. 9, with the walking control device in the present embodiment, for example, when a biped walking robot is laterally applied with an external force, with one leg grounded, and then restores an upright state with an upper body thereof inclined at an angle of δθ degrees, the inclination is corrected to make the upper body be vertical, so that the biped walking robot can be prevented from losing balance and falling.

Accordingly, the biped walking robot of the present embodiment can realize walking operation resistant to an external force even without providing a sensor on a foot sole. Additionally, since the walking control device of the present embodiment requires no calculation of convergence on a target ZMP unlike in a conventional walking control device, track calculation speed can be increased. Additionally, the walking control device of the present embodiment is capable of coping with a change in a position of center of gravity caused by arbitrary movement of an upper body and can therefore follow quick movement with ease. Further, the walking control device of the present embodiment enables walking to be naturally started or a walking speed to be changed by intentionally causing the biped walking robot to incline forward to have a forward inclination.

Further, description will be made of a difference between the walking control recited in Patent Literature 1 and the walking control of the present embodiment.

Figure 10:
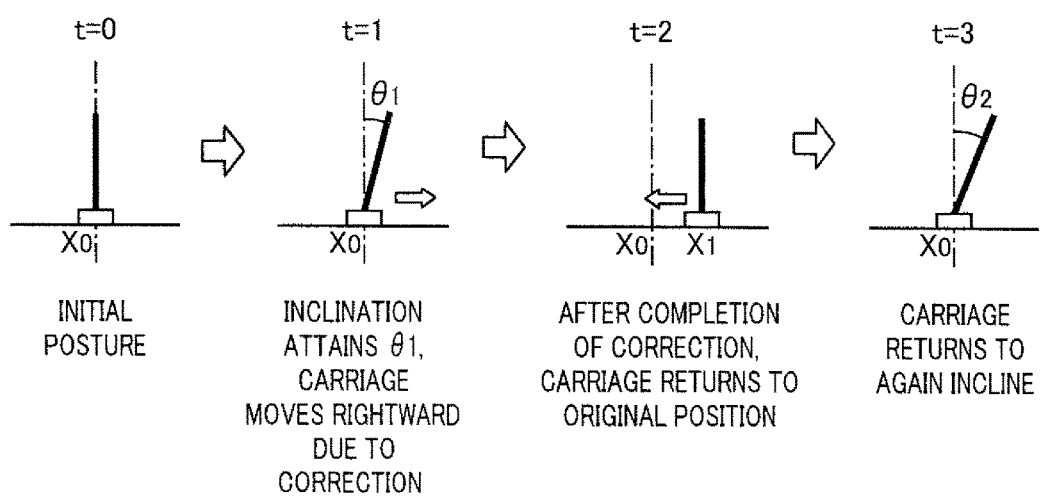
FIG. 10 is a schematic diagram for explaining walking control recited in Patent Literature 1 using an inverted pendulum.
Figure 11:
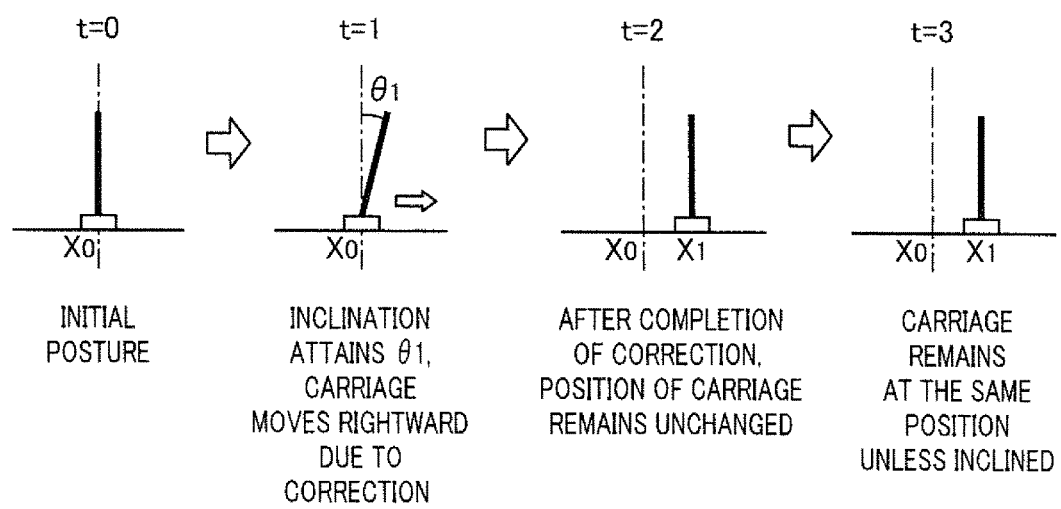
FIG. 11 is a schematic diagram for explaining walking control of the present embodiment using an inverted pendulum.

FIG. 10 is a schematic diagram for explaining the walking control recited in Patent Literature 1 using an inverted pendulum, and FIG. 11 is a schematic diagram for explaining walking control of the present embodiment using an inverted pendulum.

First, the walking control in Patent Literature 1 will be described. As shown in FIG. 10, in an initial posture at time t=0, a carriage is positioned at $X_0$ and an inclination e of the inverted pendulum is 0. At this time, a control amount K is $X_0$. Next, at time t=1, the carriage is positioned at $X_0$, and when the inclination e of the inverted pendulum attains $\theta_1$, the control amount K is represented as $X_0 + \alpha\theta_1 = X_1$, so that the carriage is moved by a distance $(X_1 - X_0)$ to a direction toward which the inverted pendulum inclines. Next, at time t=2, the carriage is positioned at $X_1$, and when the inclination e of the inverted pendulum attains 0, the control amount K attains $X_0$, so that the carriage is moved by a distance $(X_0 - X_1)$ in an opposite direction to be returned to an initial position. Next, at time t=3, because the carriage is returned to the initial position by the control at time t=2, the inclination e attains $\theta_2$ to invalidate correction of the inclination. On this occasion, $\theta_1 < \theta_2$ is ordinarily established.

Thus, in the walking control method in Patent Literature 1, stability after a free leg lands is ensured not by constantly maintaining the upper body vertically but by making a stride correspond to an inclination angle remaining immediately before landing of the free leg.

Subsequently, description will be made of walking control of the present embodiment. As shown in FIG. 11, in an initial posture at time t=0, the carriage is positioned at $X_0$ and the inclination e of the inverted pendulum is 0. At this time, a corrected integrated value I is 0 and the control amount K is represented as $X_0+I=X_0+0=X_0$. Next, at time t=1, the carriage is positioned at $X_0$, and when the inclination e of the inverted pendulum attains $\theta_1$, the corrected integrated value I attains $I+\alpha\theta_1$ and the control amount K attains $X_0+I=X_0+\alpha\theta_1=X_1$, so that the carriage is moved by the distance $(X_1-X_0)$ in a direction toward which the inverted pendulum inclines. Next, at time t=2, the carriage is positioned at $X_1$, and when the inclination e of the inverted pendulum attains 0, the corrected integrated value I attains I+0 and the control amount K attains $X_0+I=X_1$, so that the carriage remains at the same position. Next, at time t=3, when the inclination e of the inverted pendulum is 0, the carriage remains at the same position, so that unless an external force is applied, the inclination e of the inverted pendulum is maintained to be 0.

In the walking control method of the present embodiment, since correction amounts are thus integrated, a correction amount is added to the corrected integrated value I after correction and is incorporated into a constant value. Therefore, a stable point of a biped walking robot is held to realize stable balance control.

Specifically, behaviors are completely different between conventional control (proportional control) in which a correction amount corresponding to an inclination angle of an upper body is added to fixed standard walking operation and control (integral control) of the present embodiment in which an integrated value of correction amounts each corresponding to an inclination angle of an upper body is added to fixed standard walking operation.

In the above embodiment, each component may be configured with dedicated hardware or may be realized by executing a software program appropriate for each component. Each component may have operation or function realized by reading and executing a software program recorded in a computer-readable recording medium such as a hard disk or a semiconductor memory by a program execution unit such as a CPU or a processor.

Additionally, data for use in realizing operation or function of each component may be recorded in a writable recording medium such as a semiconductor memory or a hard disk.

The walking control method, the walking control program and the biped walking robot according to the present disclosure realize stable walking operation, and are useful as a walking control method for controlling walking operation of a biped walking robot, as a walking control program and as a biped walking robot.

This application is based on Japanese Patent application No. 2016-094364 filed in Japan Patent Office on May 10, 2016, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. A walking control method in a walking control device which controls walking operation of a biped walking robot including an upper body, a first leg connected to the upper body, a second leg connected to the upper body, a first driving unit which drives the first leg, and a second driving unit which drives the second leg, the method comprising:
   acquiring, during walking operation of the biped walking robot, information indicative of an inclination angle of the upper body relative to the reference angle, the biped walking robot having a position of center of gravity adjusted at a predetermined reference angle that enables the robot to be upright; and
   operating, with one of the first leg and the second leg not being grounded due to the walking operation, the first leg and the second leg such that the upper body is maintained within a predetermined angle range relative to the reference angle according to the inclination angle.

2. The walking control method according to claim 1, wherein
   when the first leg and the second leg are operated such that the upper body is maintained within the predetermined angle range relative to the reference angle, a first correction signal is generated for correcting operation of each of the first leg and the second leg in order to maintain the upper body within the predetermined angle range relative to the reference angle based on the inclination angle, and
   a control signal is corrected based on the first correction signal, the control signal for causing the first leg and the second leg to conduct walking operation, and the corrected control signal is output to each of the first driving unit and the second driving unit.

3. The walking control method according to claim 2, wherein the first correction signal is generated by adding a first correction amount to an integrated correction amount, the first correction amount being calculated in order to maintain the upper body within the predetermined angle range relative to the reference angle based on the inclination angle, and the integrated correction amount having been integrated before the first correction amount is calculated.

4. The walking control method according to claim 3, wherein the first correction amount is calculated using a first function with the inclination angle at a predetermined time point as a variable.

5. The walking control method according to claim 3, comprising:
   generating a first control signal for causing a support leg, either the first leg or the second leg, to conduct walking operation;
   generating a second control signal for causing a free leg, either the first leg or the second leg, to conduct walking operation;
   generating a third control signal as a synthesis of the first control signal and the first correction signal, and outputting the third control signal to one of the first leg and the second leg, which serves as a support leg; and
   generating a fourth control signal as a synthesis of the second control signal and the first correction signal, and outputting the fourth control signal to the other of the first leg and the second leg, which serves as a free leg.

6. The walking control method according to claim 5, wherein
   the first correction amount and the integrated correction amount are calculated based on an inclination angle of the biped walking robot in a front-rear direction, the first control signal includes a first front-rear direction control signal for causing a support leg, either the first leg or the second leg, to be rotatably driven in the front-rear direction in walking operation of the biped walking robot, the second control signal includes a second front-rear direction control signal for causing a free leg, either the first leg or the second leg, to be rotatably driven in the front-rear direction in the walking operation of the biped walking robot, the third control signal is generated by adding the first correction signal to the first front-rear direction control signal, and the fourth control signal is generated by subtracting the first correction signal from the second front-rear direction control signal.

7. The walking control method according to claim 6, comprising:

determining whether or not a first driving amount of the first leg or the second leg based on the third control signal exceeds a first threshold value;

determining whether or not a second driving amount of the first leg or the second leg based on the fourth control signal exceeds the first threshold value;

when determining that the first driving amount exceeds the first threshold value, changing the first driving amount to the first threshold value; and when determining that the second driving amount exceeds the first threshold value, changing the second driving amount to the first threshold value.

8. The walking control method according to claim 6, wherein when the biped walking robot is supported by both the first leg and the second leg, the first correction amount is not calculated.

9. The walking control method according to claim 5, wherein the first correction amount and the integrated correction amount are calculated based on an inclination angle of the biped walking robot in a right-left direction, the first control signal includes a first right-left direction control signal for causing a support leg, either the first leg or the second leg, to be rotatably driven in the right-left direction in walking operation of the biped walking robot, the second control signal includes a second right-left direction control signal for causing a free leg, either the first leg or the second leg, to be rotatably driven in the right-left direction in the walking operation of the biped walking robot, the third control signal is generated by adding the first correction signal to the first right-left direction control signal, and the fourth control signal is generated by adding a second correction signal to the second right-left direction control signal, the second correction signal obtained by multiplying the first correction signal by a predetermined coefficient.

10. The walking control method according to claim 9, comprising:

determining whether or not a first driving amount of the first leg or the second leg based on the third control signal exceeds a second threshold value that the first leg and the second leg interfere;

determining whether or not a second driving amount of the first leg or the second leg based on the fourth control signal exceeds the second threshold value;

when determining that the first driving amount exceeds the second threshold value, changing the first driving amount to a predetermined value smaller than the second threshold value; and when determining that the second driving amount exceeds the second threshold value, changing the second driving amount to a predetermined value smaller than the second threshold value.

11. The walking control method according to claim 9, wherein when a value indicative of irregularities of a surface on which the biped walking robot walks is not more than a predetermined value, the predetermined coefficient is set to be a positive value.

12. The walking control method according to claim 9, wherein when a value indicative of irregularities of a surface on which the biped walking robot walks is more than a predetermined value, the predetermined coefficient is set to be a negative value.

13. The walking control method according to claim 5, wherein when the upper body is detected to be in an upright state in which the upper body is generally parallel to the first leg and the second leg, the integrated correction amount is cleared to be zero, and the first control signal and the second control signal are regenerated.

14. The walking control method according to claim 13, wherein amounts of change in a stride of the first leg and the second leg caused by a synthesis of the first correction signal with the first control signal and with the second control signal are stored, the stored amounts of change are added to the first control signal and the second control signal, and the stored amounts of change are reduced with a lapse of time to be converged to zero.

15. A non-transitory computer readable recording medium storing a walking control program for controlling walking operation of a biped walking robot including an upper body, a first leg connected to the upper body, a second leg connected to the upper body, a first driving unit which drives the first leg, and a second driving unit which drives the second leg, the program causing a computer to function as:

an acquisition unit which acquires, during walking operation of the biped walking robot, information indicative of an inclination angle of the upper body relative to the reference angle, the biped walking robot having a position of center of gravity being adjusted at a predetermined reference angle that enables the robot to be upright; and a control unit which causes, with one of the first leg and the second leg not being grounded due to the walking operation, the first leg and the second leg to operate such that the upper body is maintained within a predetermined angle range relative to the reference angle according to the inclination angle.

16. A biped walking robot comprising:

an upper body;

a first leg connected to the upper body;

a second leg connected to the upper body;

a first driving unit which drives the first leg;

a second driving unit which drives the second leg;

an acquisition unit which acquires, during walking operation of the biped walking robot having a position of center of gravity being adjusted at a predetermined reference angle that enables the robot to be upright, information indicative of an inclination angle of the upper body relative to the reference angle; and a control unit which causes, with one of the first leg and the second leg not being grounded due to the walking operation, the first leg and the second leg to operate such that the upper body is maintained within a predetermined angle range relative to the reference angle according to the inclination angle.

\* \* \* \* \*